(12) United States Patent
Meyer-Roscher et al.

(10) Patent No.: US 6,833,041 B1
(45) Date of Patent: Dec. 21, 2004

(54) ADHESIVES FOR FROZEN SUBSTRATES

(75) Inventors: Bernd Meyer-Roscher, Neustadt (DE); Karl-Heinz Schumacher, Neustadt (DE); Jürgen Barwich, Neustadt (DE); Ralf Fink, Limburgerhof (DE); Uwe Düsterwald, Queidersbach (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 288 days.

(21) Appl. No.: 10/088,900
(22) PCT Filed: Sep. 15, 2000
(86) PCT No.: PCT/EP00/09022

§ 371 (c)(1),
(2), (4) Date: Mar. 25, 2002

(87) PCT Pub. No.: WO01/23489

PCT Pub. Date: Apr. 5, 2001

(30) Foreign Application Priority Data

Sep. 30, 1999 (DE) .......................................... 199 46 898

(51) Int. Cl.⁷ .............................................. C09J 133/12
(52) U.S. Cl. ................. 156/272.2; 156/327; 526/328.5; 526/329.7
(58) Field of Search .......................... 156/272.2, 307.1, 156/327; 526/329.7, 328.5

(56) References Cited

U.S. PATENT DOCUMENTS 4,737,559 A    4/1988   Kellen et al.

FOREIGN PATENT DOCUMENTS

| | | |
|---|---|---|
| DE | 24 11 169 | 9/1974 |
| DE | 38 44 444 | 8/1990 |
| DE | 40 37 079 | 5/1992 |
| EP | 0 246 848 | 11/1987 |
| JP | 03 237181 | 10/1991 |
| JP | 06 158006 | 6/1994 |
| WO | 93 13148 | 7/1993 |

*Primary Examiner*—Blaine Copenheaver
*Assistant Examiner*—John T. Haran
(74) *Attorney, Agent, or Firm*—Oblon, Spivak, McClelland, Maier & Neustadt, P.C.

(57) ABSTRACT

The use of free-radically polymerized, UV-crosslinkable polymers which consist to the extent of at least 50% by weight of $C_2$ to $C_{18}$alkyl(meth)acrylates as adhesives for the bonding of carriers coated with the polymer on substrates, wherein from 0.1 to 30% by weight of the monomers of which said polymer is composed are monomers A without carboxylic acid or carboxylic anhydride groups and with a water solubility of more than 5 g of monomers per liter of water and said substrates are moist substrates, especially refrigerated substrates.

22 Claims, No Drawings

ADHESIVES FOR FROZEN SUBSTRATES

FIELD OF THE INVENTION

The invention relates to the use of free-radically polymerized, UV-crosslinkable addition polymers which consist to the extent of at least 50% by weight of $C_2$ to $C_{18}$ alkyl(meth)acrylates as adhesives for the bonding of carriers coated with the polymer on substrates, wherein from 0.1 to 30% by weight of the monomers of which said polymer is composed are monomers A without carboxylic acid or carboxylic anhydride groups and with a water solubility of more than 5 g of monomers per liter of water and said substrates are moist substrates, especially refrigerated substrates.

BACKGROUND OF THE INVENTION

UV-crosslinkable polymers and their use as adhesives—as hot-melt pressure-sensitive adhesives, for example—are known from DE-A-2 411 169, EP-A-246 848, DE-A-4 037 079 or DE-A-3 844 444, for example.

These adhesives have not been used to date for moist substrates, especially refrigerated substrates.

For producing labels for refrigerated product it is normal to use block polymers of the styrene-isoprene-styrene or styrene-butadiene-styrene type. A general disadvantage of these block copolymers lies in their softness, which leads to difficulties in the course of processing and use.

There is a desire for alternative polymers as adhesives for moist, refrigerated substrates.

SUMMARY OF THE INVENTION

It is an object of the present invention to provide alternative polymers for such a use.

We have found that this object is achieved by the use defined at the outset.

For crosslinking with UV light, the addition polymer may contain a photoinitiator. The photoinitiator may be attached to the polymer but may also be unattached and merely mixed with the polymer.

Customary photoinitiators that can be added to the polymer are, for example, acetophenone, benzoin ethers, benzil dialkyl ketals, or derivatives thereof.

The amount of photoinitiator mixed in is preferably from 0.05 to 10 parts by weight, with particular preference from 0.1 to 2 parts by weight, per 100 parts by weight of polymer.

Through irradiation with high-energy light, especially UV light, the photoinitiator or photoinitiator group brings about a crosslinking of the polymer, preferably by means of a chemical grafting reaction of the photoinitiator group with a spatially adjacent polymer chain. Crosslinking can be effected in particular by inserting a carbonyl group of the photoinitiator into an adjacent C—H bond to form a —C—C—O—H grouping.

The wavelength range within which the photoinitiator group can be activated, i.e., that in which the principal absorption band of the photoinitiator group lies, is preferably from 200 to 450 nm, with particular preference from 250 to 350 nm, with very particular preference from 250 to 280 nm.

Preferably, the photoinitiator is attached to the polymer.

The polymer is obtainable by free-radical addition polymerization from ethylenically unsaturated free-radically polymerizable compounds.

In the preferred case where the photoinitiator is attached to the polymer an ethylenically unsaturated compound having a photoinitiator group is preferably incorporated by copolymerization.

DETAILED DESCRIPTION OF THE INVENTION

The UV-crosslinkable polymer consists preferably to the extent of from 50 to 99.85% by weight, preferably from 60 to 99.4% by weight, with very particular preference from 80 to 98.9% by weight, of $C_2$ to $C_{18}$ alkyl(meth)acrylates. Preference is given to $C_2$–$C_{10}$ alkyl(meth)acrylates, e.g., n-butyl acrylate, ethyl acrylate, and 2-ethylhexyl acrylate. Mixtures of the alkyl(meth)acrylates are used in particular.

In the case of the copolymerized photoinitiator the addition polymer further consists to the extent of from 0.05 to 10% by weight, preferably from 0.1 to 2% by weight and with particular preference, from 0.1 to 1% by weight, of ethylenically unsaturated compounds having a photoinitiator group.

The ethylenically unsaturated compound having a photoinitiator group is preferably an acetophenone derivative or, with particular preference, a benzophenone derivative.

Suitable compounds are acetophenone or benzophenone derivatives containing at least one—preferably one—ethylenically unsaturated group. The ethylenically unsaturated group is preferably an acrylic or methacrylic group.

The ethylenically unsaturated group can be attached directly to the phenyl ring of the acetophenone or benzophenone derivative. In general, there is a spacer group situated between phenyl ring and ethylenically unsaturated group.

The spacer group can contain, for example, up to 100 carbon atoms.

Suitable acetophenone or benzophenone derivatives are described, for example, in EP-A-346 734, EP-A-377199 (1st claim), DE-A-4 037 079 (1st claim) and DE-A-3 844 444 (1st claim) and are incorporated by this reference into the present specification. Preferred acetophenone and benzophenone derivatives are those of the formula

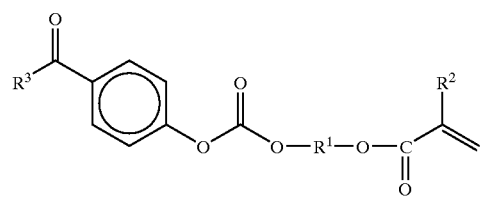

I where $R^1$ is an organic radical having up to 30 carbon atoms, $R^2$ is a hydrogen atom or a methyl group, and $R^3$ is an unsubstituted or substituted phenyl group or a $C_1$–$C_4$ alkyl group.

With particular preference, $R^1$ is an alkylene group, especially a $C_2$–$C_8$ alkylene group.

With particular preference, $R^3$ is a methyl group or a phenyl group.

The addition polymer may further include ethylenically unsaturated compounds as structural components. Mention may be made, for example, of vinyl esters of carboxylic acids containing up to 20 carbon atoms, vinylaromatics having up to 20 carbon atoms, ethylenically unsaturated nitriles, vinyl halides, vinyl ethers of alcohols containing 1 to 10 carbon atoms, aliphatic hydrocarbons having 2 to 8 carbon atoms and 1 or 2 double bonds, or mixtures of these monomers.

Examples of vinyl esters of carboxylic acids having 1 to 20 carbon atoms are vinyl laurate, vinyl stearate, vinyl propionate, Versatic acid vinyl esters, and vinyl acetate.

Suitable vinylaromatic compounds are vinyltoluene, $\alpha$- and p-methylstyrene, $\alpha$-butylstyrene, 4-n-butylstyrene, 4-n-decylstyrene and, preferably, styrene. Examples of nitriles are acrylonitrile and methacrylonitrile.

The vinyl halides are chloro-, fluoro- or bromo-substituted ethylenically unsaturated compounds, preferably vinyl chloride and vinylidene chloride.

Examples of vinyl ethers are vinyl methyl ether and vinyl isobutyl ether. Preference is given to vinyl ethers of alcohols containing 1 to 4 carbon atoms.

As hydrocarbons having 2 to 8 carbon atoms and two olefinic double bonds mention may be made of butadiene, isoprene, and chloroprene.

The addition polymer may further include monomers having carboxylic, sulfonic or phosphonic acid groups. Carboxylic acid groups are preferred. Examples that may be mentioned include acrylic acid, methacrylic acid, itaconic acid, maleic acid, and fumaric acid.

Examples of further monomers include hydroxyl-containing monomers, (meth)acrylamide or phenyloxyethyl glycol mono(meth)acrylate, glycidyl acrylate, glycidyl methacrylate, and amino(meth)acrylates such as 2-aminoethyl(meth)acrylate.

It is essential that in total from 0.1 to 30% by weight of the ethylenically unsaturated compounds of which the addition polymer is composed are the monomers A defined at the outset.

The monomers A) do not include monomers having carboxylic acid or carboxylic anhydride groups.

Monomers A have a water solubility at 21° C. of more than 5 g of monomer per liter (1) of water.

The water solubility is preferably more than 10 g/l of water.

Customary acrylic monomers on the other hand, such as $C_2$–$C_{18}$ alkyl(meth)acrylates, have a water solubility well below 5 g/l.

Preferred monomers A are selected from the acrylic monomers. Particularly suitable are hydroxyalkyl(meth)acrylates, methyl(meth)acrylate, (meth)acrylonitrile, and (meth)acrylamide.

Particular preference is given to hydroxyethyl(meth)acrylate, hydroxypropyl(meth)acrylate, methyl(meth)acrylate, (meth)acrylonitrile, and (meth)acrylamide.

Preferably from 0.5 to 20% by weight, with particular preference from 1 to 12% by weight; of the monomers are monomers A.

The addition polymer preferably has a K value of from 30 to 80, with particular preference from 40 to 60, measured in 1% solution (solvent: tetrahydrofuran, 21° C.).

The K value according to Fikentscher is a measure of the molecular weight and the viscosity of the polymer.

The glass transition temperature ($T_g$) of the addition polymer is preferably from −60 to +10° C., with particular preference from −55 to 0° C., with very particular preference from −55 to −20° C.

The glass transition temperature of the addition polymer can be determined by customary methods such as differential thermoanalysis or differential scanning calorimetry (see, e.g., ASTM 3418/82, midpoint temperature).

The UV-crosslinkable addition polymers can be prepared by copolymerizing the monomer components using the customary polymerization initiators and, if desired, using regulators, polymerization being carried out at the customary temperatures in bulk, in emulsion—for example, in water or liquid hydrocarbons—or in solution. The novel copolymers are preferably prepared by polymerizing the monomers in solvents, especially in solvents with a boiling range of from 50 to 150° C., preferably from 60 to 120° C., using the customary amounts of polymerization initiators, these amounts being generally from 0.01 to 10% by weight, in particular from 0.1 to 4% by weight, based on the overall weight of the monomers. Suitable solvents include in particular alcohols, such as methanol, ethanol, n- and isopropanol, n- and isobutanol, preferably isopropanol and/or isobutanol, and also hydrocarbons such as toluene and, in particular, petroleum spirits with a boiling range of from 60 to 120° C. It is also possible to use ketones, such as acetone and methyl ethyl ketone, and esters, such as ethyl acetate, and also mixtures of such solvents, preference being given to mixtures containing isopropanol and/or isobutanol in amounts of from 5 to 95% by weight, in particular from 10 to 80% by weight, preferably from 25 to 60% by weight, based on the solvent mixture used.

In the case of solution polymerization, appropriate polymerization initiators include, for example, azo compounds or ketone peroxides.

Following the polymerization in solution, the solvents can if desired be separated off under reduced pressure, operating at elevated temperatures in the range, for example, of from 100 to 150° C. In this case the polymers can be used in the solvent-free state, i.e., as melts. In many cases it is also of advantage to prepare the novel UV-crosslinkable polymers by polymerization in bulk, i.e., without the use of a solvent, in which case it is possible to operate batchwise or else continuously, in accordance, for example, with the information in U.S. Pat. No. 4,042,768.

The addition polymer can be a melt, a solution in an organic solvent, or an aqueous dispersion and can be used in this form.

The polymers are preferably used in the form of a melt, i.e., in essentially solvent-free form (solvent content preferably less than 2% by weight based on the polymer).

The polymer can be applied to carriers, preferably from the melt, by usual techniques, such as brushing, rolling, flow coating, or knife coating, for example. In the case of the solution or aqueous dispersion, the solvent or water is removed, generally by drying.

In order to increase the flowability of the polymer, the temperature of the polymer in the case of application as a melt can be from 10 to 150° C., preferably from 50 to 150° C., with particular preference from 100 to 150° C.

Preferred film thicknesses are for example from 2 to 50 $\mu$m, with particular preference from 5 to 40 $\mu$m, with very particular preference from 10 to 30 $\mu$m.

Suitable carriers include, for example, labels made of paper or plastic, e.g., polyester, polyolefins or PVC, and also adhesive tapes or sheets of the above plastics.

Subsequently, the polymers are crosslinked with high-energy radiation, preferably UV light.

For this purpose, the coated carriers are generally placed on a conveyor belt and the conveyor belt is guided past a radiation source; for example, a UV lamp.

The degree of crosslinking of the polymers depends on the intensity and duration of irradiation.

The radiation energy is preferably in total from 100 to 1500 $mJ/cm^2$ of irradiated surface.

The resulting, polymer-coated carriers can be bonded to moist substrates, especially refrigerated substrates. These substrates may, for example, be frozen product packaged with paper or with polymer films.

Despite the moisture, and/or a film of water or layer of ice on the substrates, very good adhesion of the coated carriers, e.g., labels, is found.

The addition polymer is therefore suitable as an adhesive, or pressure-sensitive adhesive, especially hot-melt pressure-sensitive adhesive, for moist substrates, especially refrigerated substrates. In comparison to hot-melt pressure-sensitive adhesives based on styrene-butadiene(isoprene)-styrene block copolymers, the addition polymers exhibit a much higher thermal stability and reduced strikethrough, by which is meant the penetration of the adhesive coating to the front face, the generally printed face of the carrier. In the case of paper labels in particular, strikethrough results in an unwanted visual deterioration.

EXAMPLES

I) Addition Polymers

P1: Acrylic polymer composed of 91% by weight ethylhexyl acrylate and 9% by weight hydroxyethyl acrylate C1: Acrylic polymer composed of 100% by weight ethylhexyl acrylate The polymers were prepared by conventional solution polymerization with subsequent distillative removal of the solvent.

II) Preparation of the Coated Carriers and Testing

The polymers P1 and C1 were each coated from the melt onto label paper at a temperature of 120° C. The film thickness was 20 μm.

The coated label paper was irradiated with UV light and the polymer was crosslinked.

The label paper was bonded to a polyethylene plate and the force required for peeling, in N/25 mm, was determined using a tensile testing machine.

The experiment was carried out at different temperatures of the polyethylene surface:

|    | +25° C. | +5° C. | −20° C. | −10° C. * |
|----|---------|--------|---------|-----------|
| P1 | 4.2     | 5.8    | 3.7     | 3.6       |
| C1 | 1.9     | 3.5    | 3.3     | 3.0       |

* The polyethylene surface was first wetted so that a coherent film of water formed.

We claim:

1. A process for bonding a polymer coated carrier to a refrigerated substrate, said process comprising coating said carrier with said polymer, and bonding said polymer coated carrier with said refrigerated substrate, wherein said polymer is a free radically polymerized, UV cross-linkable addition polymer, said polymer comprises at least 50 wt. % of at least one $C_2$–$C_{18}$ alkyl(meth)acrylate and from 0.1–30 wt. % of a polymerized monomer A, wherein said monomer A does not contain carboxylic acid or carboxylic anhydride groups and has a water solubility of more than 5 grams monomer per liter of water.

2. The process of claim 1, wherein said polymer comprises from 50–99.85 wt. % of at least one $C_2$–$C_{18}$ alkyl(meth)acrylate and from 0.05–10 wt. % of said polymerized monomer A, which comprises at least one ethylenically unsaturated compound which has a photoinitiator group.

3. The process as claimed in claim 2 wherein the ethylenically unsaturated compound is an acetophenone or a benzophenone.

4. The process of claim 1, wherein the polymer has a K value of from 30–80 measured in 1% strength by weight solution of the polymer in tetrahydrofuran at 21 C.

5. The process of claim 1, wherein the polymer has a glass transition temperature of from −60 to +10 C.

6. The process of claim 1, wherein the monomer A is selected from the group consisting of a hydroxyalkyl(meth)acrylate, methyl(meth)acrylate, (meth)acrylonitrile, (meth)acrylamide and mixtures thereof.

7. The process as claimed in claim 1 wherein the polymer is a melt.

8. The process of claim 1, wherein the carrier is first coated with the polymer to form a polymer coated carrier, then the polymer is cross linked by high-energy radiation, then the polymer coated carrier is bonded to a refrigerated substrate.

9. The process of claim 8, wherein the carrier is a label, adhesive tape or sheet.

10. The process of claim 18 wherein the high-energy radiation is UV light.

11. A method of applying a carrier to a refrigerated substrate, said method comprising applying a free radically polymerized, UV cross-linkable polymer to said carrier, wherein said polymer is in a melted form, a solution or an aqueous dispersion, removing a solvent or water, if present, then cross linking said polymer by high energy radiation, then bonding the carrier, coated with a polymer to a refrigerated substrate, said polymer is a free radically polymerized, UV cross-linkable addition polymer, said polymer comprises at least 50 wt. % of at least one $C_2$–$C_{18}$ alkyl(meth)acrylate and from 0.1–30 wt. % of a polymerized monomer A, and wherein said monomer A does not contain carboxylic acid or carboxylic anhydride groups and has a water solubility of more than 5 grams monomer per liter of water.

12. The method of claim 11 wherein the carrier is a label, adhesive tape or sheet.

13. A process for producing a refrigerated substrate, comprising:

coating a carrier with a polymer, and bonding said polymer coated carrier with said refrigerated substrate, wherein said polymer is a free radically polymerized, UV cross-linkable addition polymer, said polymer comprises at least 50 wt. % of at least one $C_2$–$C_{18}$ alkyl(meth)acrylate and from 0.1–30 wt. % of a polymerized monomer A, wherein said monomer A does not contain carboxylic acid or carboxylic anhydride groups and has a water solubility of more than 5 grams monomer per liter of water.

14. The process of claim 13, wherein said polymer comprises from 50–99.85 wt. % of at least one $C_2$–$C_{18}$ alkyl(meth)acrylate and from 0.05–10 wt. % of said polymerized monomer A, which comprises at least one ethylenically unsaturated compound which has a photoinitiator group.

15. The process as claimed in claim 14, wherein the ethylenically unsaturated compound is an acetophenone or a benzophenone.

16. The process of claim 13, wherein the polymer has a K value of from 30–80 measured in 1% strength by weight solution of the polymer in tetrahydrofuran at 21 C.

17. The process of claim 13, wherein the polymer has a glass transition temperature of from −60 to +10 C.

18. The process of claim 13, wherein the monomer A is selected from the group consisting of a hydroxyalkyl(meth)acrylate, methyl(meth)acrylate, (meth)acrylonitrile, (meth)acrylamide and mixtures thereof.

19. The process as claimed in claim 13, wherein the polymer is a melt.

20. The process of claim 13, wherein the carrier is first coated with the polymer to form a polymer coated carrier, then the polymer is cross linked by high-energy radiation, then the polymer coated carrier is bonded to a refrigerated substrate.

21. The process of claim 20, wherein the carrier is a label, adhesive tape or sheet.

22. The process of claim 20, wherein the high-energy radiation is UV light.

* * * * *